(12) United States Patent  (10) Patent No.: US 6,668,994 B2
Hirt  (45) Date of Patent: Dec. 30, 2003

(54) TORQUE TRANSFER DEVICE

(75) Inventor: Gunter Hirt, Kongsberg (NO)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/219,053

(22) Filed: Aug. 14, 2002

(65) Prior Publication Data

US 2003/0066728 A1 Apr. 10, 2003

Related U.S. Application Data

(63) Continuation of application No. PCT/DE01/00183, filed on Jan. 16, 2001.

(51) Int. Cl.$^7$ .............................. F16H 3/08; F16D 47/00
(52) U.S. Cl. ......................................... 192/48.8; 74/330
(58) Field of Search ............................ 192/3.63, 48.8; 74/330

(56) References Cited

U.S. PATENT DOCUMENTS

| | | | | |
|---|---|---|---|---|
| 4,461,188 A | * | 7/1984 | Fisher | 74/330 |
| 4,463,621 A | * | 8/1984 | Fisher | 74/330 |
| 5,181,431 A | * | 1/1993 | Zaiser et al. | 192/48.8 |
| 5,613,401 A | * | 3/1997 | Maurizio | 74/330 |

FOREIGN PATENT DOCUMENTS

DE     199 21 687 A1   *   11/2000

* cited by examiner

*Primary Examiner*—Rodney H. Bonck
(74) *Attorney, Agent, or Firm*—Darby & Darby

(57) ABSTRACT

The invention relates to a device for transmitting the torque. The inventive device comprises at least one first and at least one second coupling device which can be switched into different switching positions respectively. The inventive device further comprises a drive device and an actuating device.

50 Claims, 7 Drawing Sheets

TORQUE TRANSFER DEVICE

CROSS-REFERENCE TO RELATED APPLICATION

This is a continuation of international application No. Serial No. PCT/DE01/00183, filed Jan. 16, 2001, which is hereby incorporated by reference in its entirety.

TECHNICAL FIELD

The invention relates to a torque transfer device with at least one first and at least one second clutch device.

BACKGROUND

A torque transfer device is in the sense of the present invention in particular a device which under predetermined conditions can convert a rotary characteristic of a rotationally movably mounted component part, such as input shaft, into an identical or different rotary characteristic of another rotary mounted component part such as output shaft, wherein if required these component parts can be coupled and uncoupled. More particularly it is proposed that the torque transfer device can be shifted into different shift positions.

A rotary characteristic is in the sense of the present invention more particularly a characteristic value which at least in part describes the rotational status of a rotary mounted component part, such as shaft. The rotary characteristic is in particular a torque or speed.

A torque transfer device has in the sense of the present invention more particularly a clutch device and/or a transmission device and/or a torque converter device or the like.

Devices which can transfer torque and have clutch devices are already known.

The object of the invention is to provide a torque transfer device which is designed technically different.

According to one particular aspect the object of the invention is to provide a torque transfer device having several clutches which can be actuated with structurally low expense cost-effectively and with high operational reliability.

According to a particular aspect the object of the invention is to design a torque transfer device having a power shift clutch and a transmission device so that the energy loading of the power shift clutch as well as the synchronising times and the jolts during shifting of the transmission device are low.

This is achieved through a torque transfer device or through a control device for controlling a torque transfer device or through a method for operating a torque transfer device which has at least one feature of the features which are described in the following description and in the claims or are shown in the drawings.

This is further achieved through a method for operating a torque transfer device as disclosed and illustrated herein.

Further preferred embodiments of the invention form the subject of the sub-claims.

According to the invention in particular a torque transfer device is provided which has at least a first clutch device, more particularly designed as a power shift clutch, as well as at least a second clutch device, more particularly designed as a start-up clutch. These clutch devices each have an input device as well as an output device which is mounted rotationally movable relative to the input device at least when the clutch device is disengaged. Where necessary the input devices of the different clutch devices are connected together rotationally secured, and preferably detachable.

The input device of the first clutch device has in particular a clutch disc and where necessary further component parts and the output device of the first clutch device preferably has a clutch cover and/or a flywheel and/or a pressure plate and/or a toothed wheel and where necessary further component parts and/or is coupled to same secured against rotation.

The input device of the second clutch device has in particular a clutch cover and/or a flywheel and/or a pressure plate and where necessary further component parts and/or is coupled to this rotationally secured and the output device of the second clutch device preferably has a clutch disc.

A clutch cover and/or a flywheel and/or a pressure plate of the first and/or second clutch device is preferably made from cast iron.

The flywheel is not restricted only to wheel-shaped component parts but can be shaped differently. A flywheel is in particular a flywheel mass.

The first and second clutch device are mounted in a drive train, preferably of a motor vehicle, namely between a drive side on which an internal combustion engine preferably acts as the vehicle drive, and an output side on which a vehicle drive axle is preferably provided.

According to the invention the mass and/or inertia mass of at least one of the output devices is greater than the mass and/or inertia mass of the associated input device of the same clutch device. More particularly the mass and/or inertia mass of the first output device of the first clutch device is greater than the mass and/or inertia mass of its first input device and the mass and/or inertia mass of the second input device of the second clutch device is greater than the mass and/or inertia mass of the second output device of the second clutch device.

In the sense of the present invention a mass is a mass and/or an inertia mass.

According to the invention in particular a torque transfer device is provided with a first clutch device which has at least one first clutch disc as well as at least one first flywheel body, as well as with a second clutch device which has at least a second clutch disc as well as at least a second flywheel body. The clutch discs can rotate relative to the flywheel bodies or masses dedicated to each identical clutch device at least in at least partly opened shift position of the relevant clutch device. The first and second clutch device are each mounted inside a drive train, more particularly connected in parallel, namely between a drive side on which an internal combustion engine is preferably mounted, and an output side on which a vehicle drive axle is preferably mounted. At least one of the clutch discs is facing the output side, whilst the flywheel mass or flywheel dedicated to the same clutch device faces the drive side. The first clutch disc of the first clutch device preferably faces the drive side and the second clutch disc of the second clutch device faces the output side whilst the flywheel masses or wheels each associated with these relevant clutch discs face each other side.

A clutch device is in the sense of the present invention in particular a device in which in at least two different shift positions a different ratio is provided from at least one input signal or input rotary characteristic such as torque or speed, to at least one output side or output rotary characteristic wherein this device is designed in particular so that in these different shift positions the ratio of the useful power supplied to this device, such as mechanical or electrical or pneumatic or hydraulic power, to the useful power discharged from the device is different. The clutch device can be shifted in particular into at least one first shift position in which a signal or rotary characteristic is transferred substantially unchanged, as well as into at least a second shift position in which a rotary characteristic is substantially not transferred, and where necessary into at least a third shift position in which a rotary characteristic is transferred in part or restricted to a predetermined value.

The clutch device is designed with or without a power branch and self-adjusting or non-self-adjusting.

A clutch device is in the sense of the present invention self-sustaining or depressed or designed in some other way wherein self-sustaining is to mean that the clutch device, if it is not actuated, is held in a substantially closed shift position by way of example by means of an energy accumulator, such as spring device or the like, and wherein depressed is to mean that the clutch device if it is not actuated is held in a substantially opened shift position by way of example by means of an energy accumulator such as spring device.

The clutch device can transfer a signal or rotary characteristic in a positive locking, friction-locking or other way and has where necessary self-resilient clutch linings and/or a spring and/or damper device.

The clutch device is designed more particularly as a start-up clutch and/or power shift clutch and/or converter lock-up clutch and has in particular a friction clutch with two or more friction faces and/or a turning set clutch and/or a multi-plate clutch and/or a magnetic powder clutch and/or a claw clutch. It is particularly preferred if the clutch device is controlled electronically and is in particular an automated clutch, preferably such as that offered by the applicant under the name Electronic Clutch Management (EKM).

The power shift clutch or the first clutch device enables in particular that when shifting between different gears of a transmission device torque is transferred through the transmission device so that it is possible to shift to and from between different gears under load.

The first and second clutch device are disposed adjacent one another or spatially separated from each other.

The first clutch device is in particular shifted parallel to the second clutch device. A parallel arrangement of the fist and second clutch device is in particular configured so that between a first and a second shaft torque can also be transferred through the second clutch device when the first clutch device is opened and vice versa.

Preferably the first and second clutch device each have a release lever mechanism which is designed so that a pressurised (force exerted by an actuating device on this release lever mechanism produces tensile force on the contact pressure plate of this clutch device or so that the pressurised force exerted on the release lever mechanism creates pressurised force on the contact pressure plate.

Preferably the release lever mechanism of the first clutch device has a substantially rigid release lever and the release lever mechanism of the second clutch device has a plate spring or a release lever designed as a plate spring.

The first clutch device is preferably designed as a depressed clutch device and the second clutch device as a self-sustaining clutch device wherein this is effected in particular through spring devices which load the relevant contact pressure plate of the relevant clutch device.

Preferably a torque transfer device according to the invention has at least one, more particularly just one or just two drive devices which control at least one actuating device which actuates the first and/or second clutch device.

The drive device is in the sense of the present invention more particularly a device which can convert an input energy form into an output energy form wherein the input and output energy forms are in particular of different kinds and wherein the output energy form can be used as useful energy, namely in particular in order to load or actuate component parts or the like. Preferably the drive device converts electrical energy into kinetic energy. The drive device has in particular a motor, such as electric motor.

It should be pointed out that manual actuation, such as for example the manual actuation of a shift lever or the like can also be a drive device in the sense of the present invention.

Preferably the first clutch device is arranged at least in part in a first drive train branch of the drive train and the second clutch device is arranged at least in part in a second drive train branch wherein the first and second drive train branches are preferably connected in parallel. The first and second drive train branch preferably coincide at a predetermined point on the output side which depends where necessary on the shift position of a transmission device and/or at least a third clutch device so that a load transferred through the first drive train branch is transferred from this point in the direction on the output side at least in part through an identical drive train section as a load transferred through the second drive train branch.

Preferably the first clutch device has at least a first spring and/or damper device and/or the second clutch device has at least a second spring and/or damper device which is integrated in a clutch disc of this relevant clutch device or acts outside of same in the drive train. Preferably at least a first spring and/or damper device is mounted in the drive train branch of the first clutch device and/or at least a second spring and/or damper device is mounted in the drive train branch of the second clutch device.

Preferably the actuating device has at least an actuating release device which can load or actuate the first release mechanism or the first release lever of the first clutch device and/or the second release mechanism or second release lever of the second clutch device. At least one of these actuating release mechanisms is mounted on the end of the actuating device facing the first release lever or the first release device and/or on the end facing the second release lever or the second release mechanism. Preferably this actuating release mechanism is disposed in the axial direction between the first and second release lever. Between the first and/or second release lever and the actuating release device adjoining same in the force flow direction there is preferably a slide bearing or rolling bearing which is associated with this actuating release device. Preferably the actuating release device has at least one sealed rolling bearing such as a ball bearing.

Preferably at least one actuating release mechanism is designed so that it is ensured that at the coupling points between the actuating device and the release levers of the first and second clutch device there is no or only slight relative movement in the circumferential direction of the clutch devices which causes a not inconsiderable friction wherein the actuating release mechanism has at least a rolling and/or slide bearing.

Preferably the torque transfer device has at least a transmission device which is designed particularly preferred as a power shift transmission device.

A transmission device is in the sense of the present invention in particular a device which can be shifted stepped or continuously as well as with or without tractive force interruption into different shift positions in which a different transmission ratio is provided between two component parts such as shafts mounted rotationally movable. The shift processes of the transmission device are in particular undertaken automatically or manually or partially automatically or automatically with additional manual override facility or in another way. Preferably the transmission device is controlled electronically. The transmission device can have an automated shift transmission or a continuously variable transmission such as CVD, or a manual shift gear or a step-change gear or an automatic gear or an automated shift gear (ASG) or an automatic transmission.

The transmission device preferably has several wheels such as toothed wheels which are mounted on a first shaft, as well as several wheels which are mounted on a second shaft. Predetermined combinations of these wheels mounted on the first and second shaft are associated with predetermined transmission stages wherein the same or different transmission ratios can be effected between the first and second shaft through different transmission stages. These transmission stages are preferably in part gear transmission stages wherein a third clutch device is associated with each of these gear transmission stages and is able to couple and uncouple a wheel mounted rotatable on the first or second shaft to this shaft. The third clutch devices are preferably positive locking clutches, such as claw clutches. The third clutch devices are designed with or without synchronisation device. A synchronisation device has at least two component parts which can turn relative to each other in at least a first shift position and which can be coupled during operation so that torque or speed tuning can be undertaken for the parts moved relative to each other.

The wheels can be coupled so that they engage directly in each other or so that they engage indirectly in each other or in some other way. With indirect engagement of the wheels a further component part such as a belt contact means or the like can be connected in between the wheels.

Preferably at least one of the transmission stages arranged between the first and second shaft and designated in particular a power shift transmission stage is designed so that a wheel such as a toothed wheel of the transmission stage is mounted rotatable on one of the shafts, more particularly the first shaft, whilst another wheel is coupled rotationally secured to the other of these shafts, more particularly the second shaft. This wheel which is mounted rotatable on the first shaft can be coupled with this first shaft by means of the first clutch device which is in particular a power shift clutch and/or a friction clutch.

Preferably the first clutch device is a power shift clutch device which is then actuated at least when a gear change is shifted. The power shift clutch device or the power shift transmission stage thus enables in particular that even during a gear change torque is transferred between the gear input and the gear output. Where necessary the power shift transmission stage or the power shift clutch device is designed so that torque can be transferred through the power shift clutch device and through the power shift transmission stage even for a longer period of time so that the power shift transmission stage can also undertake the function of a gear stage.

Preferably the first clutch device is controlled so that at least then when all third clutch devices are in an opened shift position the first clutch device is closed at least in part so that torque can be transferred through the first clutch device and through the power shift transmission stage. It is particularly preferred if a torque transfer device according to the invention is mounted in a motor vehicle wherein this motor vehicle has a vehicle drive device such as an internal combustion engine, as well as at least a vehicle drive axle which can be driven by the internal combustion engine. Torque can preferably be transferred between the vehicle drive device and the drive axle of the vehicle preferably through the first clutch device a well as the power shift transmission stage at least when the remaining gears are not engaged or the third clutch devices are shifted into an open shift position.

The torque transfer device according to the invention as well as the control device according to the invention are preferably used in a motor vehicle.

By the term "control" is meant in the sense of the present invention in particular "regulate" and/or "control" in the sense of the DIN. The same applies to the terms derived from the term "control".

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

The invention will now be explained in further detail with reference to the embodiments which are not restricting and are given by way of example.

IN THE DRAWINGS

FIG. 1 shows a first embodiment of the invention by way of example in diagrammatic illustration.

Figure 1:
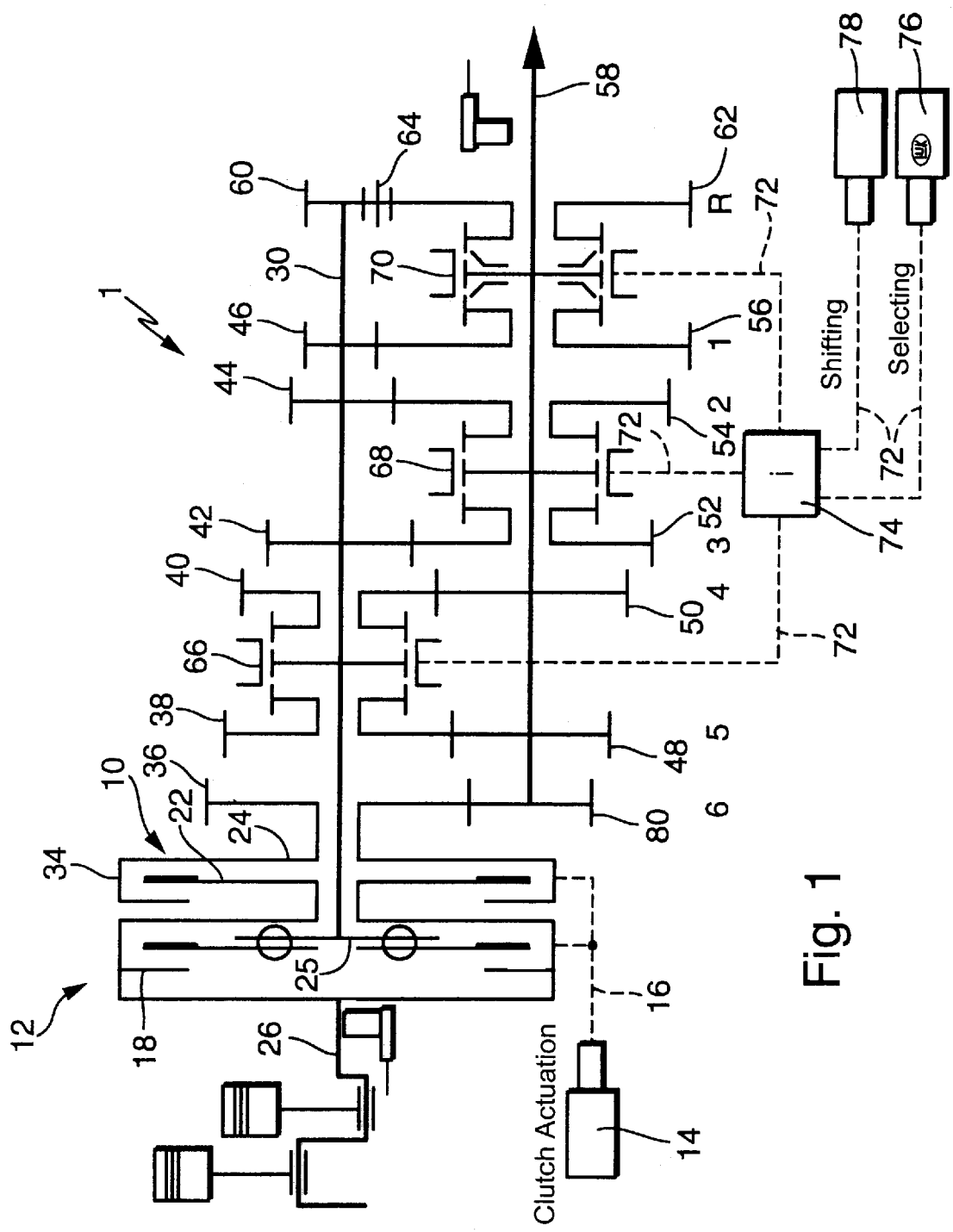
FIG. 1 shows a first embodiment by way of example of the invention in diagrammatic partially sectional view.

The torque transfer device 1 has a first clutch device 10 as well as a second clutch device 12.

The first 10 and second clutch device 12 have a drive device 14 as well as an actuating device 16 coupled thereto, which is shown in marked diagrammatic form. The drive device 14 can load the actuating device 16 which can in turn cause the first 10 or second clutch device 12 to be shifted into different shift positions. The drive device 14 has preferably at least one preferably just one electric motor.

The shift positions of the second clutch device 12 are designed so that in at least one first shift position a substantially unrestricted torque can be transferred between the input device 18 of the second clutch device 12 and the output device 20 of the second clutch device 12 and in at least a second shift position the input device 18 can be uncoupled from the output device 20 so that no torque can be transferred between these devices 18, 20. Where necessary in at least a third shift position of the second clutch device 12 a restricted torque can be transferred between the input device 18 and the output device 20. This means in particular slip can be provided between the input device 18 and the output device 20.

The shift positions of the first clutch device 10 are designed so that in at least a first shift position an input device 22 of the first clutch device 10 is uncoupled from an output device 24 of the first clutch device 10 so that no torque can be transferred between these devices 22, 24 through the first clutch device 10, in at least a second shift position restricted torque can be transferred through the first clutch device 10 and in at least a third shift position a substantially unrestricted torque can be transferred through the first clutch device 10. In the shift position in which the first clutch device 10 can only transfer restricted torque slip can be provided, namely particularly if the useful power introduced into the first clutch device is greater than a predetermined value.

The first and/or second clutch device 12 have in particular, although not shown in precise detail, a contact pressure plate as well as where necessary a stop coupled to the input device 18. At least one clutch disc is mounted in the axial direction between this stop and this contact pressure plate and is coupled to the output device 20 or 24 or is the actual output device 20 or 24. The friction faces or friction linings of the first 10 and/or second clutch device 12 are self-resilient where necessary.

The second clutch device 12 is in particular a self-sustaining start-up clutch so that the second clutch device 12 is shifted substantially in a closed shift position when it is not actuated or is not loaded by the actuating device.

The first clutch device 10 is in particular a depressed power shift clutch which means in particular that the first clutch device 10 is shifted substantially in an opened shift position when it is not actuated or is not loaded by the actuating device 16.

In the embodiment according to FIG. 1 the first 10 and second clutch device 12 are connected in parallel, which means in particular that the first clutch device 10 in an at least partially closed shift position can also transfer torque when the second clutch device 12 is opened and vice versa.

The input device 18 of the second clutch device 12 has a second clutch cover and/or a flywheel mass and is coupled to a crankshaft 26 of a motor vehicle, which is loaded by an internal combustion engine whose cylinder 28 is shown in diagrammatic form.

The output device 20 of the second clutch device 12 which has one or more clutch discs is coupled to the first shaft 30—where required through a spring and/or damper device—and can transfer torque at least in part to this first shaft 30.

The input device 22 of the first clutch device 10 which has at least one clutch disc is coupled to the input device 18 of the first clutch device.

The output device 24 of the first clutch device 10 which is connected to a flywheel mass or a clutch cover 34 of the second clutch device is coupled rotationally secured to a wheel 36 of a power shift transmission stage which will be described below. This wheel 36 of the power shift transmission stage which is in particular an externally toothed spur wheel is mounted on the first shaft 30. Where necessary the output device 24 of the first clutch device 10 is coupled through a spring and/or damper device to the wheel 36 of the power shift transmission stage and can transfer torque at least in part to this wheel 36.

Several wheels 38, 40, 42, 44, 46 are mounted on the first shaft 30 and are each associated with a transmission stage or gear stage and are here externally toothed spur wheels. Each of these wheels 38, 40, 42, 44, 46 engages in a wheel 48, 50, 52, 54, 56 which is mounted on a second shaft 58. The second shaft 58 is mounted parallel to the first shaft 30. The wheel pairings 38-48 or 40-50 or 42-52 or 44-54 or 46-56 are each associated with a transmission stage or gear stage, namely preferably in this sequence the fifth to first gear.

In the embodiment according to FIG. 1 these transmission stages or gear stages are mounted on the first shaft 30 or second shaft 58 respectively so that the highest of these gear stages faces the second clutch device 12 or the internal combustion engine (not shown) and the transmission stage of the first gear is mounted on the output side or faces a drive axle of a motor vehicle with torque transfer device 1 wherein the remaining gear stages are arranged in numerical order between the first and fifth gear stage.

Each of these gear stages 38-48, 40-50, 42-52, 44-54, 46-56 has a wheel 38, 40, 52, 54, 56 which is mounted rotatable on the first 30 or second shaft 58. Another wheel or the other wheel 48, 50, 42, 44, 46 of these transmission stages is mounted rotationally secured on each other of these shafts 30, 58.

These rotatably mounted wheels 38, 40, 52, 54, 56 are mounted in particular on the first 30 and second shaft 58 respectively so that at least one further rotatably mounted wheel 38, 40, 52, 54, 56 is mounted adjacent each of these rotatably mounted wheels 38, 40, 52, 54, 56.

A further wheel 60 mounted on the first shaft 30 and which in particular is an externally toothed spur wheel as well as a further wheel 62 mounted on the second shaft 58 and is in particular an externally toothed spur wheel is associated with a further transmission stage or gear stage.

A further wheel 64 which is likewise an externally toothed spur wheel is connected in between these toothed wheels 60,62 wherein the wheel 60 engages in the wheel 64 and the toothed wheel 64 engages in the toothed wheel 62. The effect of this interposed toothed wheel 64 is that the rotational direction of the wheels 60, 62 is identical and that with the same direction of rotation of the first shaft 30 the rotational direction of the second shaft 58 when the transmission stage 60-64-62 is connected is opposite that compared with the transmission stages 38-48, 40-50, 42-52, 44-54, 46-56.

The transmission stages or gear transmission stages 38-48, 40-50, 42-52, 44-54, 46-56 are in particular forward gears whilst the transmission or gear stage 60-64-62 is a reverse gear. The power shift transmission stage still to be mentioned below likewise preferably acts as forward gear.

The wheel 62 of the reverse gear stage or transmission stage 60-62-64 is mounted rotatable on the second shaft, and the wheel 60 is mounted rotationally secured on the first shaft 30.

Adjoining the wheels 38, 40, 52, 54, 56, 62 of the gears or gear stages or transmission stages 38-48, 40-50, 42-52, 44-54, 46-56 and 60-64-62 respectively mounted rotatable on the first 30 and second shaft 58 respectively there are third clutch devices 66, 68, 70 which can each be shifted into different shift positions. By means of these third clutch devices 66, 68, 70 it is possible for the wheels 38, 40, 52, 54, 56, 62 mounted movable on the first 30 and second shaft 58 to be coupled rotationally secured to the relevant shaft 30, 58.

At least one of the third clutch devices 66, 68, 70 has a positive locking clutch which is in particular a claw clutch.

The illustration according to FIG. 1 shows the wheels 38, 40, 42, 54, 56, 62 mounted rotatable on the first 30 and second shaft 58, as well as the third clutch devices 66, 68, 70 each arranged and configured so that the clutch devices 66, 68, 70 are each arranged between two rotatably mounted wheels of the transmission stages and in different shift positions can couple each one of these each adjoining wheels to the relevant shaft 30, 58 wherein these third clutch devices 66, 68, 70 can be shifted in particular into each further shift position in which they do not couple any of the adjoining wheels 38, 40, 52, 54, 56, 62 mounted rotatable on the first 30 or second shaft 58 to the first 30 or second shaft 58.

It is thus proposed in particular that the clutch devices 66, 68, 70 are each associated with two wheels of the transmission stages.

The third clutch devices 66, 68, 70 are actuated or shifted by an actuating device 72 which where necessary has a transmission stage 74. The actuating device 72 is loaded by a drive device which has a first electric motor 76 and a second electric motor 78.

The actuating device 72 is designed so that in the event of load through the first electric motor 76 the actuating device can be shifted into a shift position from which each one predetermined gear stage can be shifted, and this predetermined gear stage can be engaged through the second electric motor 78.

The actuating device 72 or a predetermined component part of the actuating device 72 such as a shift shaft (not shown), is preferably moved or loaded in different directions during shifting into a predetermined shift position from which a gear can be engaged, during so-called selecting, on the one hand, and during shifting into a predetermined gear stage, during so-called shifting, on the other hand. These different movement or load directions are caused in particular each time through one of the different electric motors 76, 78. These different movement or load directions can be for example in the case of a shift shaft such that the latter is moved or loaded on the one hand in the circumferential direction and on the other in the axial direction.

A further transmission stage is provided between the first shaft 30 and the second shaft 58 and has a wheel 36 mounted rotatable on the first shaft and formed here as an externally toothed spur wheel, as well as a wheel 80 mounted rotationally secured on the second shaft 58. This transmission stage 36-80 is designated a power shift transmission stage. The transmission ratio of the power shift transmission stage is such that it is greater than the transmission ratios of the gear stages. The power shift transmission stage 36-80 is mounted on the drive side of the gear transmission stages 38-48, 40-50, 42-52, 44-54, 46-56, 60-62.

According to one aspect the torque transfer device 1 according to the invention functions as follows:

If a motor vehicle with torque transfer device 1 according to the invention is operated in a predetermined gear stage and a shift process between different gears has not been initiated or has terminated, thus torque is to be transferred between the first and second shaft through the transmission stage 38-48 or 40-50 or 42-52 or 44-54 or 46-56 or 60-64-62, the second clutch device 12 is in a closed shift position and the first clutch device 10 is in an open shift position. Thus torque is transferred from the crankshaft 26 to the input device 18 of the second clutch device 12. Since the second clutch device 12 is in a closed shift position this torque is passed on at least in part to the first shaft 30.

One of the third clutch devices 66, 68, 70 connects one of the rotatably mounted wheels 38, 40, 52, 54, 56, 62 rotationally secured to the first 30 or second shaft 58. The rest of these third clutch devices 66, 68, 70 are shifted in an open shift position so that the remaining rotationally mounted toothed wheels can turn on the shaft 30 or 58 respectively.

It is assumed in the following by way of example that the starting transmission stage, thus a transmission stage from which at a later moment in time there is to be a shift into another transmission stage, is the transmission stage of the first gear so that torque is transferred from the first shaft 30 through the wheel 46 to the wheel 56 and from this wheel 56 through the closed third clutch device 70 to the second shaft 58.

Since the first clutch device 10 is shifted in an opened shift position the torque of the first shaft 30 which loads the input device 22 of the first clutch device 10 is not transferred through the first clutch device 10 to its output device 24 and thus to the wheel 36 of the power shift transmission stage 36-80 so that the wheel 80 of the power shift transmission stage mounted on the second shaft 58 is substantially not loaded by the wheel 36 of the power shift transmission stage mounted on the first shaft 30.

If a shift is to be made into another gear stage, it may be assumed here by way of example that a shift is to be made into the gear stage of third gear, a signal is sent to the first clutch device 10 from a control device (not shown). This signal causes the first clutch device 10 to be closed at least in part. The concrete shift position of the first clutch device 10 which is controlled at first by the control device or drive device 14 or actuating device 16 depends in particular on predetermined characteristic values. Such characteristic values can be in particular the transmission ratio of the engaged gear stage of the output gear, thus here the gear stage of the first gear, or the transmission ratio of this gear stage or the identity of the shaft on which the third clutch device of the output gear is mounted or the speed or torque of the first shaft 30 or second shaft 58 or the like.

The controlled shift position of the first clutch device 10 or its release mechanism 82 is designed in particular so that the third clutch device 70 can be shifted into a shift position in which no torque can be transferred between the toothed wheel 56 of the output gear, or—here the first gear stage—and the third clutch device 70. This shift is executed so that all third clutch devices 66, 68, 70 are shifted in an opened shift position and torque is transferred between the first shaft 30 and the second shaft 58 only through the power shift transmission stage 36-80.

The first clutch device 10 or release lever mechanism of the first clutch device is then controlled so that it is possible that the transmission stage 42-52 of the target gear—thus here the third gear—can be shifted by means of a third clutch device 68 without this third clutch device 68 and this toothed wheel 52 which is to be coupled to this third clutch device 68 having to be synchronised by means of synchronising rings or the like in order to guarantee a high operating reliability. To this end predetermined characteristic values are used where applicable, such as for example the characteristics which are described in the description of the closing of the first clutch device 10 above.

A shift is then made into the target gear. For the example where the target gear is third gear, the third clutch device 68 is shifted so that it connects the toothed wheel 52 mounted rotatable on the second shaft 58 to this second shaft 58 in rotationally secured manner.

The first clutch device 10 is then opened again so that the torque between the first shaft 30 and second shaft 58 is transferred completely through the target gear stage, here the transmission stage 42-52 of the third gear.

During the entire shift process between the output gear and target gear torque is transferred between the crankshaft 26 and a drive axle of a motor vehicle.

The first 10 and second clutch device 12 are mounted in particular at least in part in a common clutch housing 32.

Figure 2:
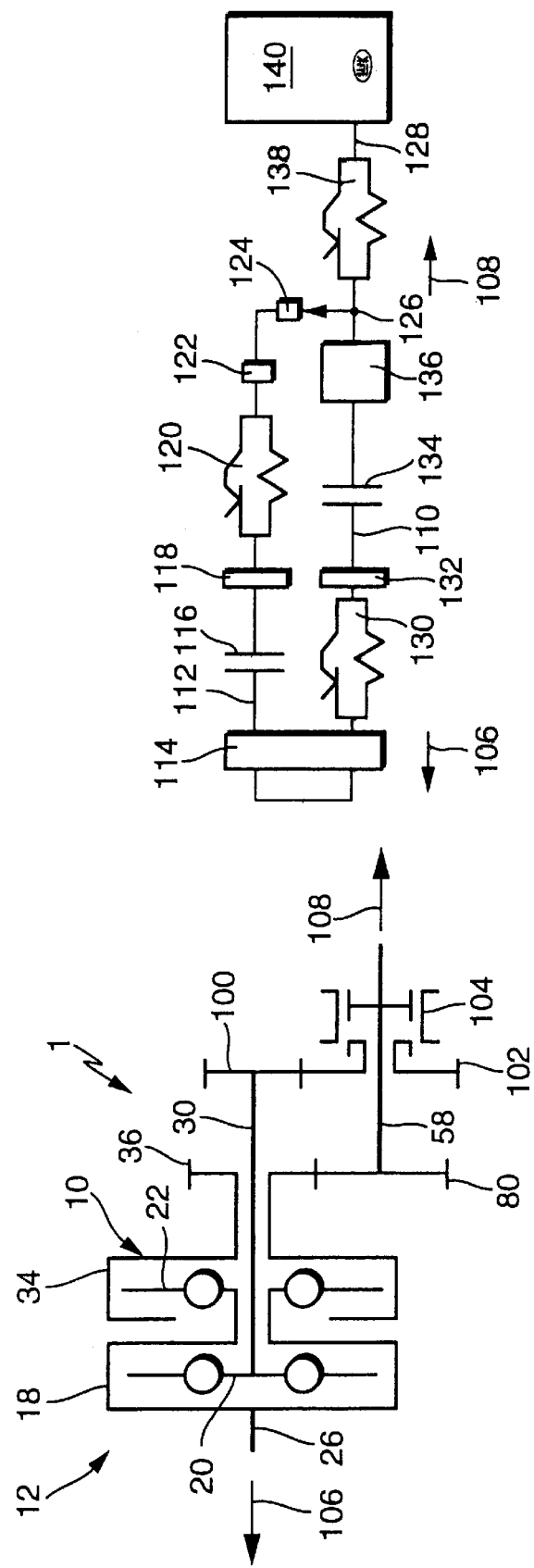
FIG. 2 shows a second embodiment by way of example of the invention in diagrammatic partially sectional view.

FIG. 2 shows diagrammatically in partial sectional view the torque transfer device 1 according to FIG. 1. As opposed to FIG. 1 here in FIG. 2 an example of a gear transmission stage is shown which has a toothed wheel 100 mounted rotationally secured on the first shaft 30, as well as a toothed wheel 102 mounted rotationally movable on the second shaft 58 and which can be coupled rotationally secured to the second shaft 58 through a third clutch device 104.

The arrow 106 points in the direction of the drive side and the arrow 108 points in the direction of the output side.

FIG. 2 shows furthermore an equivalent circuit diagram of a torque transfer device according to the invention by way of example, and more particularly the torque transfer device according to the invention shown likewise in FIG. 2.

In this equivalent circuit diagram the arrow 106 points in the direction of the drive side and the arrow 108 towards the output side. The drive train has two parallel drive train branches 110, 112. In the first drive train branch 110 there is a first clutch device 10 which is the power shift clutch, and in the second drive train branch 112 there is a second clutch device 12 which is the start-up clutch device.

These parallel connected drive train branches 110, 112 can each be located on the drive side by a device which has a first mass. This device with the first mass is shown diagrammatically in FIG. 2 through the first mass 114. This device with the first mass or this first mass 114 takes into account in particular the masses of the component parts which are arranged on the input side of the first clutch device 10 or second clutch device 12 respectively inside the drive train.

These are in particular the mass or inertia mass of the crankshaft 26 and/or input part 18 of the second clutch device 12 and/or a second clutch cover and/or a second contact pressure plate and/or a second flywheel body such as flywheel of the second clutch device and/or a clutch housing and where necessary clutch elements which couple the input part 18 of the second clutch device or a flywheel body of the second clutch device or a clutch cover of the second clutch device to the input device 22 of the first clutch device and/or to a clutch disc of the first clutch device.

The second clutch device 12 can be shifted into different shift positions wherein in at least one of these shift positions the second input device 18 is separated from the second output device 20 of the second clutch device 12 so that no torque can be transferred between these devices 18,20, and wherein in at at least one second shift position these devices 18, 20 are coupled so that at least torque limited to a restricted value can be transferred. The second clutch device 12 is configured so that on the output side of the first mass 14 in the equivalent circuit diagram there is a second separating device 116 which in particular is an ideal separating device which can basically only cause separation and connection of component parts and is to be regarded as mass-free and free of a spring and/or damper system.

The second clutch device 12 is designed so that in the equivalent circuit diagram a fourth mass 118 is mounted in the second drive train 112 on the output side of this second separating device 116. This fourth mass 118 takes into account in particular the mass of the second clutch disc of the second clutch device which is coupled to the first shaft 30. On the output side of the fourth mass 118 is a second spring and/or damper system 120 disposed in the second drive train branch 112 of the equivalent circuit diagram. This spring and/or damper system 120 takes into account in particular the spring and/or damping properties of the second clutch device or its friction linings or the action of a spring and/or damper device mounted between the second clutch disc and the first shaft 30.

In the equivalent circuit diagram a fifth mass 122 is mounted in the second drive train on the output side of the spring and/or damper system 120 and in particular takes into account the mass or inertia mass of the first shaft 30 as well as of the component parts, such as toothed wheels or the like, coupled rotationally secured to these, and in particular in the torque transfer device 1 according to FIG. 2 takes into account the inertia mass of the toothed wheel 100. Where necessary this mass 122 takes into account the mass of further component parts.

On the output side of the mass 122 in the equivalent circuit diagram of a torque transfer device according to the invention there is a shift circuit 124 which in the equivalent circuit diagram is to be regarded as substantially mass-free and which can generate and release in particular a detachable connection.

On the output side of the circuit 124 the second drive train branch 112 opens at a point 126 into the first drive train branch 110 so that particularly in the direction of the output side 108 there is a non-parallel connected drive train end 128 in the equivalent circuit diagram in the torque transfer device according to the invention.

The first mass 114 is furthermore mounted on the drive side of the first drive train branch 110.

Where necessary the inertia mass 114 acting on the first 110 as well as second drive train 112 can be different.

In the equivalent circuit diagram a first spring and/or damper system 130 is mounted in the first drive train branch on the output side of the first mass 114.

The first spring and/or damper system 130 takes into account in particular the spring and/or damping characteristics or properties of the clutch disc mounted on the drive side of the first clutch device 10 and/or a spring and/or damper device which is mounted on the drive side of the first clutch disc of the first clutch device 10 and where necessary between the first clutch disc and the second clutch cover and/or second flywheel wheel or a second input device 18 of the second clutch device 12.

In the equivalent circuit diagram of a torque transfer device 1 according to the invention given by way of example a second mass 132 is shifted in series on the output side of the first spring and/or damper system 130 in the first drive train branch 110 and takes into account in particular the mass of the first input device or of the first clutch disc of the first clutch device 10. On the output side of the second mass 132 in the equivalent circuit diagram of a torque transfer device 1 according to the invention and given by way of example there is a first separating device 134 which in the equivalent circuit diagram has the function of coupling and uncoupling component parts on the drive side with those on the output side. In the equivalent circuit diagram this first separating device 134 is to be regarded in particular as a mass-free separating device. This first separating device 134 takes into account in particular the function of the first clutch device 10 which in at least one shift position uncouples a first input device 22 from a first output device 24 of this first clutch device 10 so that no torque can be transferred, and couples in at least a further shift position so that torque can be transferred which is restricted to a predetermined value or basically not restricted at all.

In the equivalent circuit diagram of a torque transfer 1 according to the invention a third mass 136 is mounted on the output side in the first separating device 134 in the first drive train branch 110. This third mass 136 takes into account in particular the inertia mass of a first output device 24 and/or a first clutch cover 34 of the first clutch device 10 and/or a flywheel of the first clutch device 10 and/or where necessary at least one component part such as a toothed wheel 36 of a power shift stage which is coupled rotationally secured to the first clutch cover 34 or to this first flywheel. On the output side of the third mass 136 in the equivalent circuit diagram of an example of a torque transfer device 1 according to the invention the point 136 is disposed at which the first 110 and second drive train branch 112 coincide.

In the drive train end 128 on the output side of the point 126 there is a third spring and/or damper system 128. This spring and/or damper system 128 takes into account in particular the spring and/or damper characteristics or properties which are given in a motor vehicle on the output side of the parallel drive train branches 110, 112 which have the first 10 and second clutch device 12.

On the output side of the third spring and/or damper system 138 in the equivalent circuit diagram of the torque transfer device 1 there is a seventh mass 140 which takes into account in particular the inertia masses of the component parts which are provided in the motor vehicle with torque transfer device 1 according to the invention, on the output side of the first drive train 110 of the first clutch device 10 and of the second drive train 112 of the second clutch device 12.

Figures 3, 4:
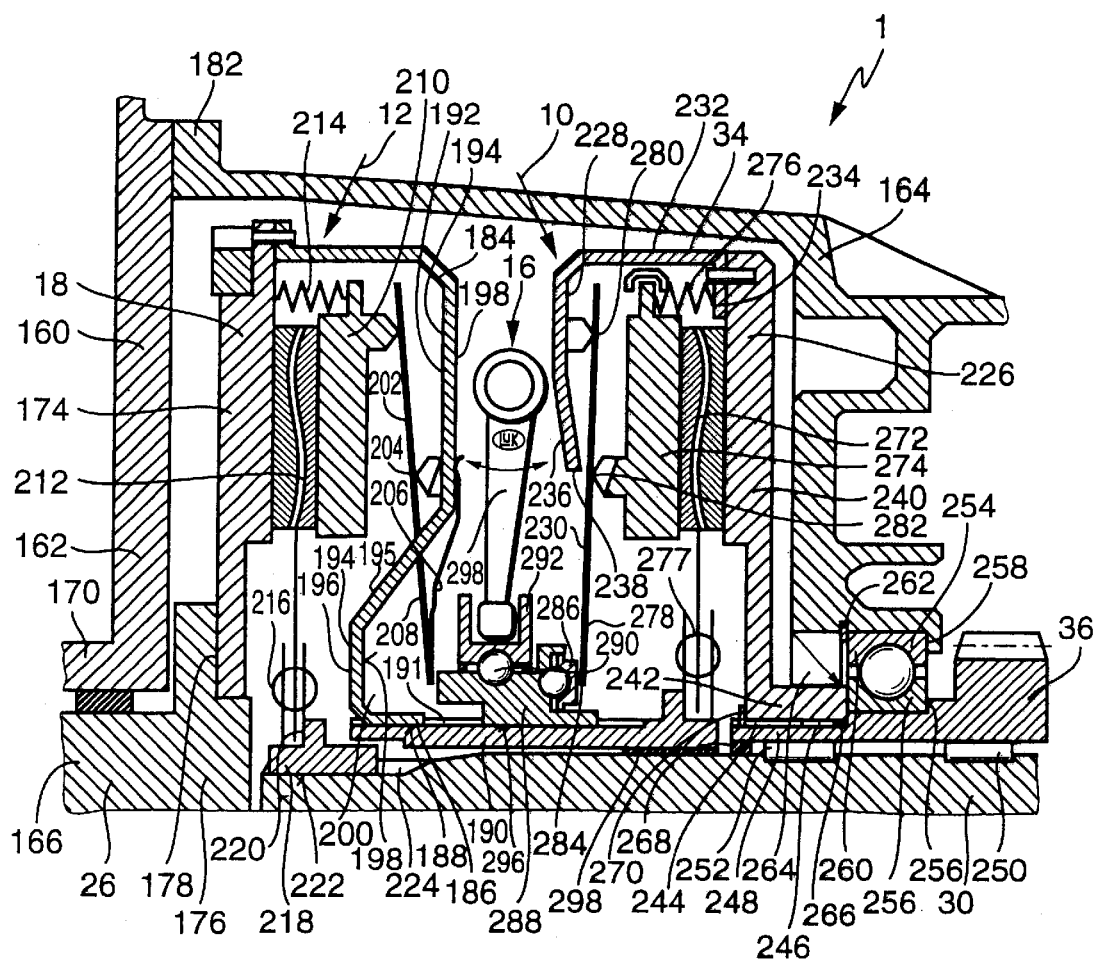
FIG. 3 shows a third embodiment by way of example of the invention in diagrammatic partially sectional view.
FIG. 4 shows a fourth embodiment by way of example of the invention in diagrammatic partially sectional view.

FIG. 3 shows by way of example an embodiment of a torque transfer device 1 according to the invention with a first 10 and second clutch device 12 in diagrammatic partial view.

The first 10 and second clutch device 12 are mounted in a common clutch housing 160. The clutch housing 160 has a first housing part 162 as well as a second housing part 164. The housing part 162 has an opening 166 through which the crankshaft 26 extends which is coupled where necessary secured against rotation to the clutch housing 160. The crankshaft 26 is sealed from the clutch housing 160 by means of a sealing device 168. This sealing device 168 is in particular a static sealing device.

The first housing part 162 is in particular designed disc-shaped and has a cylindrical flange 170. The disc like part of this first housing part 162 extends substantially in the radial direction of the crankshaft 26. The cylindrical flange 170 of the first housing part 162 extends substantially concentric with the crankshaft 26.

The second housing part 164 of the clutch housing 160 is pot-shaped and has a through opening 172. The first housing part 162 is coupled rotationally secured and centred where applicable relative to the second housing part 164 through suitable fixing means such as screws or the like.

The crankshaft 26 is coupled to a second input device 18 of the second clutch device 12 rotationally secured through suitable fixing means such as screws (not shown). The second input device 18 has a stop and a pressure plate or flywheel body such as a second flywheel 174. This second flywheel 174 is centred on the crankshaft 26. In the embodiment according to FIG. 3 this centring is configured so that the crankshaft 26 has on its output side end 176 a shoulder 178 on which is axially disposed the second flywheel 174 which is provided with a through opening 180. The second flywheel 174 is supported in the radial direction on the shaft and is fixed through suitable fixing means such as screws on the shoulder 178. Where necessary the centring bolts extend from the second flywheel 174 into the shoulder 178 of the crankshaft 26.

The substantially disc shaped second flywheel 174 provided with a shoulder is coupled rotationally secured to the second clutch cover 184 of the second clutch device 12 which has a radially extending ring shaped flange 182 concentric with the crankshaft, and is centred where necessary, whereby fixing means such as screws (not shown) are provided for coupling. The centring which is provided where required is through centring bolts (not shown) or through some other way. The second clutch cover 184 is pot-shaped and has in its radially inner region a through opening 186 which is restricted substantially by a cylindrical flange 186 which is arranged concentric with the crankshaft 26. This flange 186 has radially on the inside a wedged spline 188 which engages in a wedged spline 192 arranged radially outside on the sleeve-shaped component part 190 and extending concentrically about the first shaft 30 so that the sleeve shaped component part 190 is connected rotationally secured and axially displaceable to the second clutch cover 184.

The second clutch cover 184 is configured so that a first region 192 substantially radially on the outside of the cover base 194 extends further in the direction of the first clutch device 10 than a second region 196 of this cover base 194 arranged radially inside this first region 192. A return 200 extends substantially inwards on the outside 198 of the cover base 194 facing the first clutch device 10.

A support region 204 is arranged on the inside 202 of the first cover base 194 of the second clutch cover 184 of the second clutch device 12, and a second release lever 206 of the second clutch device 12 which is designed as a plate spring is supported on the support region. This plate spring extends through openings 208 in the second clutch cover 194 and has tabs which are supported on the outside 198 of the cover base 194 of the second clutch cover 194.

The second release lever 206 adjoins the second contact pressure plate 210 radially outside of the support region 204 so that it can bear on same.

Axially between the axially displaceable contact pressure plate 210 and the pressure plate or the second flywheel 174 there is an axially displaceable second clutch disc 212 arranged so that the second clutch disc 212 can be coupled with friction locking between the contact pressure plate 210 and the pressure plate or the second flywheel 174.

The second contact pressure plate 210 is loaded by a spring device 214.

The second clutch device 12 has a second adjusting device 216 which acts to compensate wear on the friction linings of the second clutch disc 214.

The second clutch disc 214 is mounted axially displaceable and rotationally secured on the first shaft 30 by means of a hub 218 which is sleeve-shaped and has in particular a radially outward shoulder 220. This hub 218 has radially on the inside a wedged spline 222 which engages in a wedged spline 224 of the first shaft 30 so that the second clutch disc 212 is mounted axially displaceable and rotationally secured on the first shaft 30.

The first clutch device 10 which is formed as a power shift clutch has a stop or a pressure plate or a flywheel body such as a first flywheel 226 which is coupled rotationally secured to the first clutch cover 34 by suitable connection means, such as screws or the like, and is centred by means of suitable centring means such as centring pins.

The first clutch cover 34 is pot-shaped and has in the cover base 228 a substantially concentric through opening 230 whose diameter is comparatively large compared with the diameter of the first clutch cover 34. The diameter of this through opening 230 is in particular larger than the radius of the first clutch cover 34. The first clutch cover 34 has a cylindrical edge 232 from which a ring-shaped flange 234 extends radially inwards on the side of the first clutch cover 34 remote from the second clutch device 12, and from which on the side of the first clutch cover 34 facing the second clutch device the cover base 228 extends radially inwards, with its radially inner region 236 running increasingly in the direction remote from the second clutch device. The radially inner end 238 of the cover base 228 is formed as a free end.

The first pressure plate or the first flywheel 226 of the first clutch device 10 has a radially extending disc-like region 240 whose wall thickness is greater radially on the outside than radially on the inside, as well as a sleeve 242 which extends concentric to and around the first shaft 30 and which extends axially radially inwards from the disc-like region. This sleeve 242 engages radially inwards by a wedged spline 244 into a radially outer wedge spline 246 of an axial projection 248 of the toothed wheel 36 of the power shift transmission stage, whereby the toothed wheel 36 is rotationally secured to the first shaft 10 and the axial projection extends concentric around the first shaft 10.

The rotationally secured connection between the axial projection 248 and the toothed wheel 36 is reached through close-tolerance springs 250, 252.

The projection 248 is mounted radially on the outside in the clutch housing 160 by means of a rolling bearing 254. The inner ring 256 of this rolling bearing 254 is supported axially on one side on a shoulder 258 of the projection 248 and on the other side on the sleeve 242. The outer ring 260 of the rolling bearing 254 is supported axially on the clutch housing 160 as well as on a securing ring 262 mounted in the clutch housing 160.

Sealing elements 264, 266, 268 are mounted between the housing 160 and the sleeve 242 as well as between the sleeve 242 and the axial projection 248 and between the axial projection 248 and the first shaft 30. The sleeve 242 is fixed axially opposite the axial projection 248 by means of the securing ring 270.

The first clutch disc 272 is mounted adjoining the pressure plate or the first flywheel 226 concentric and in the direction facing the second clutch device 12. The contact pressure plate 274 is arranged adjacent and concentric with the first clutch disc 272 on the side of the first clutch disc 272 remote from the first flywheel 226. The first contact pressure plate 274 is loaded by means of the first spring device 276 so that the first clutch device 10 is held in the non-actuated state in a substantially opened shift position. The first clutch disc 272 is mounted rotationally secured and centred radially inwards on the sleeve-like component part 190.

The first clutch device 10 has in particular a first adjusting device 277 which automatically adjusts to wear on the clutch disc 272.

A first release lever 278 is supported at a first point 280 on the inside of the cover base 228 of the first clutch cover 34 as well as at a second point 282 radially inside the first point 280 on the first contact pressure plate 274 and at a third point 284 radially inside the second point 282 on a rolling bearing 286 of the first actuating release device 288 so that this actuating release device 288 is mounted rotatable relative to the first release lever 278. The first actuating release device 288 is furthermore supported by a rolling bearing 290 rotatable relative to the second actuating release device 292 which is mounted substantially radially outside of the first actuating release device 288.

The second actuating release device 292 engages in a swivel mounted release fork 294 which by means of swivel movement causes the first actuating release device 288 to be moved axially on the sleeve-like component part 190. The first actuating release device 288 has radially on the inside a wedged spline 296 which engages in the wedged spline 191 of the sleeve like component part 190 so that the first actuating release device 288 is mounted axially displaceable but rotationally secured relative to the sleeve like component part 190.

The configuration of the radially inner region 236 of the cover base 228 of the first clutch device 10 is in particular adapted to the swivel angle which the release fork 294 can execute so that undesired stopping of the release fork 294 against the first clutch cover 34 is avoided.

The return 200 of the cover base 94 of the second clutch device 12 is in particular configured so that the first actuating release device 188 can move in the event of axial displacement into this return 200 without undesirably stopping against the second clutch cover 184.

Sealing elements 264, 266, 268 are mounted between the housing 160 and the sleeve 242 as well as between the sleeve 242 and the axial projection 248 and between the axial projection 248 and the first shaft 30. The sleeve 242 is fixed axially relative to the axial projection 248 by means of the securing ring 270.

Through axial displacement of the first actuating release device 288 the first release lever 278 can be loaded in one direction and the second release lever 206 can be loaded in the other direction so that the first clutch device 10 becomes increasingly closed and the second clutch device 12 becomes increasingly opened.

The first clutch disc 272 of the first clutch device 10 is mounted axially displaceable relative to the second housing cover 184 whereby during axial movement of the first clutch disc 272 the sleeve like component part 190 which is coupled to same is moved in the axial direction. The axial position of the second clutch cover 184 thereby remains unchanged since the sleeve-like component part 190 is connected to the clutch cover 184 through a wedged spline so that only torque but not axial forces are transferred.

The sleeve like component part 190 is mounted radially inside on the first shaft 30 by means of a bearing device 298 which is a slide bearing bush or a rolling bearing or the like.

The connection through the wedge splines 188, 191 between the sleeve like component part 190 and the second clutch cover 184 is in particular designed to be detachable. Where necessary the second clutch cover 184 can be uncoupled from the sleeve-like component part 194. Where necessary further sealing devices are provided which ensure that the clutch housing 160 is sealed substantially fluid-tight on the outside.

FIG. 4 shows an embodiment of the invention by way of example in diagrammatic partial view.

The part of the torque transfer device 1 shown diagrammatically in FIG. 4 differs from the embodiment illustrated in FIG. 3 substantially in that the second clutch cover 184 is fixed axially relative to the sleeve-like component part 190 by means of the securing rings 310, 312.

As opposed to the embodiment according to FIG. 3 the sleeve like component part 190 in FIG. 4 is not identical with the hub of the first clutch disc 272.

The hub 314 in the embodiment according to FIG. 4 houses the clutch disc 272 in a centred and rotationally secured manner. The hub 314 is substantially sleeve-shaped and has in its radially outer part a shoulder. In the radially inner region the hub 314 has a wedged spline 316 which engages in the wedged spline 318 arranged radially outside on the sleeve like component part 190 and which corresponds to the wedged spline 191 or is different therefrom.

The axial displacement between the second clutch cover 184 and the first clutch disc 274 is thus ensured, unlike in FIG. 3, through the wedged spline 316, 318 which is provided between the sleeve like component part 190 and the hub 314 and which furthermore couples the hub 314 rotationally secured to the sleeve like component part 190.

Figure 5:
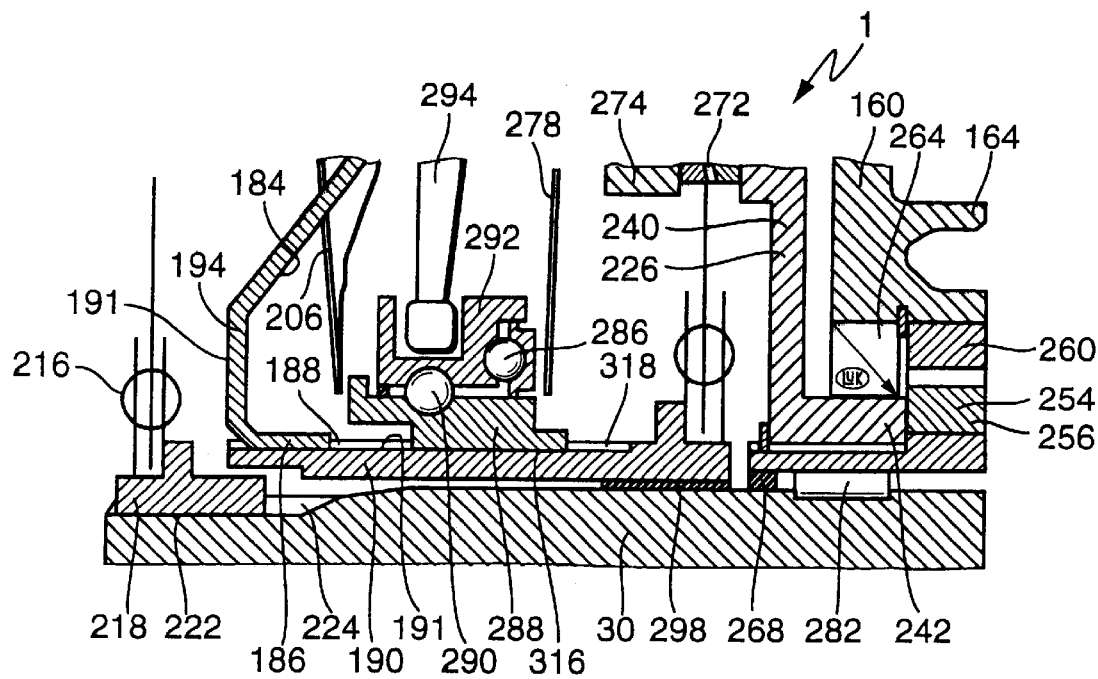
FIG. 5 shows a fifth embodiment by way of example of the invention in diagrammatic partially sectional view.

FIG. 5 shows an example of an embodiment of a torque transfer device according to the invention in which unlike that according to FIG. 3, the rolling bearing 286 is not mounted between the first actuating release device 288 and the first release lever 278 but between this first release lever 278 and the second actuating release device 292 so that the rolling bearing 286 contacts or loads the release lever 278 at least when the first clutch device 10 is actuated.

Figure 6:
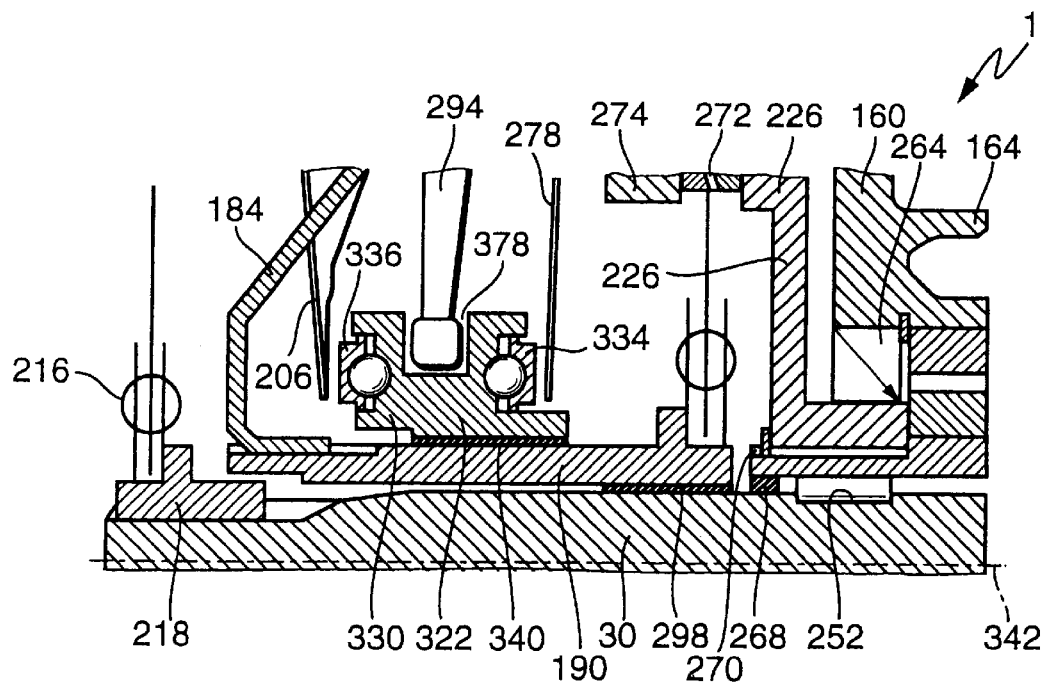
FIG. 6 shows a sixth embodiment by way of example of the invention in diagrammatic partially sectional view.

FIG. 6 shows an embodiment by way of example of a torque transfer device according to the invention in diagrammatic view wherein the actuating release devices are formed differently from the embodiment according to FIG. 1.

The actuating release mechanism 330 according to FIG. 6 has a one-piece base body 332 which through a first rolling bearing 334 or through a second rolling bearing 336 at least during actuation of the first release lever 278 or the second release lever 206 adjoins this first release lever 278 or the second release lever 206.

The one-piece base body 232 has a ring-shaped indentation 338 extending radially outside into the inside and in which the release fork 294 engages. Radially inside, differing from the illustration according to FIG. 3, the one-piece base body 232 is mounted rotationally movable relative to the sleeve like component part 190 and is supported radially on this sleeve like component part 190 through a bearing device which is configured in particular as a slide bearing bush 340.

The release fork 294 engages in the actuating release device 230 and is mounted substantially rotationally secured relative to the central axis 342 of the first shaft 30.

Figure 7:
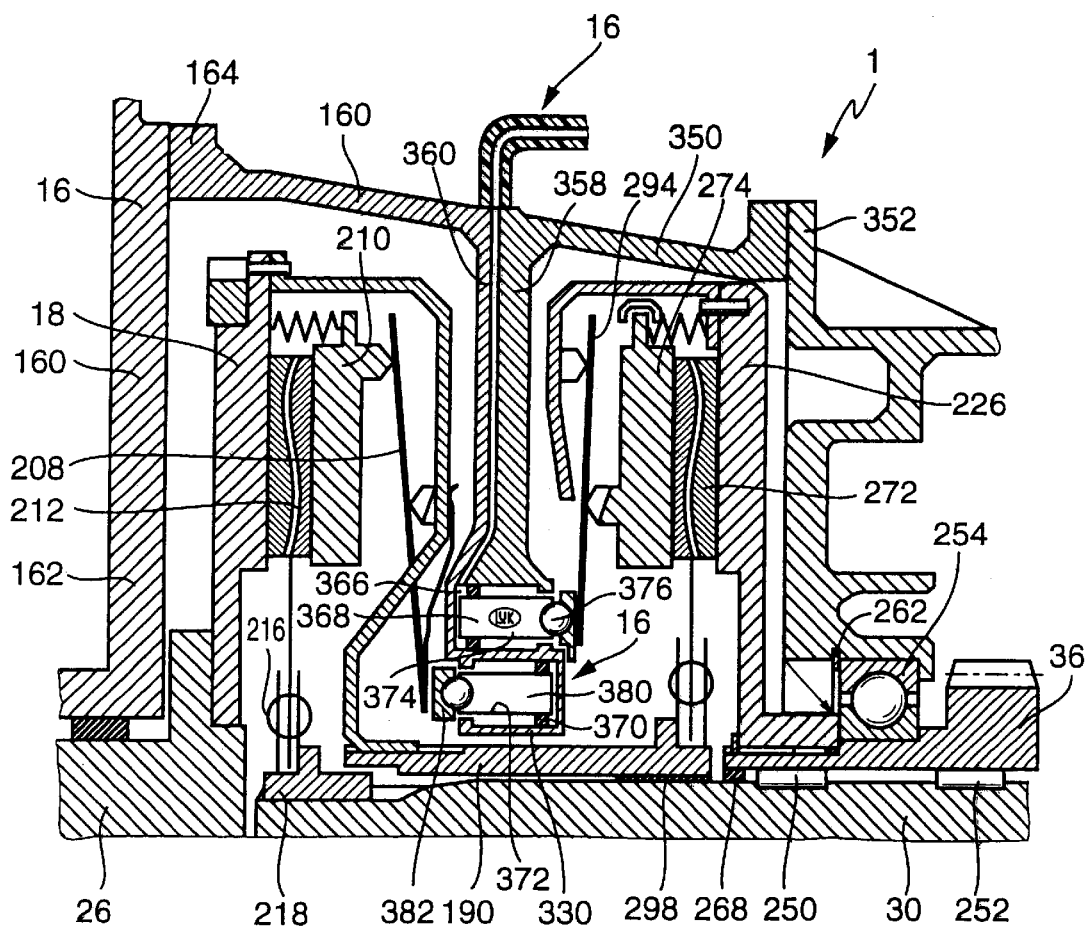
FIG. 7 shows a seventh embodiment by way of example of the invention in diagrammatic partially sectional view.

FIG. 7 shows an embodiment of the torque transfer device 1 which differs from the embodiment according to FIG. 3 in particular through the configuration of the clutch housing 160 and through the configuration of the actuating device 16.

In the embodiment according to FIG. 7 the first housing part 162 of the clutch housing is mounted substantially rotationally movable relative to the crankshaft 26.

In the embodiment according to FIG. 7 the second housing part 164 is formed in several parts and has a third housing part 350 as well as a fourth housing part 352. The fourth housing part 352 differs from the bottom of the second housing part 364 of FIG. 3 substantially in that a flange 354 is provided radially on the outside through which the fourth housing part 352 is coupled at a flange 356 to the third housing part 350. This coupling is configured by means of suitable connecting means such as screws or the like and preferably has centring means such as centring pins or the like.

The third housing part 350 has a region 358 which extends radially into the inside of the housing and which is formed in one piece with the third housing part 350. Inside this region 358 there are hydraulic pipelines 360 which produce a connection between a pipe connection 362 which is mounted on the outside of the housing and enables a link between the hydraulic pipeline 360 and the hydraulic pipeline 364 projecting out of the housing, and a first chamber 366, a first piston/cylinder device 368 or a second chamber 370, a second piston/cylinder device 372.

In FIG. 7 only one of these hydraulic pipelines 360 is illustrated.

The first piston 374 of the first piston/cylinder device 368 is at least then connected to the first release lever 284 of the first clutch device through a bearing such as a rolling bearing 376, and can at least then load same when the first chamber 366 of the first piston/cylinder device 368 is increasingly filled with hydraulic fluid.

In a corresponding way the second piston 380 of the second piston/cylinder device 372 can load the second release lever 208 of the second clutch device 12 through a bearing, such as rolling bearing 382 at least when the second chamber 370 of the second piston cylinder device 372 is increasingly filled with fluid so that the second piston 380 becomes increasingly loaded.

Unlike the embodiment according to FIG. 3 in the embodiment according to FIG. 7 the actuating device 16 or the actuating release mechanism 330 is not supported on the sleeve-like component part 190.

Figure 8:
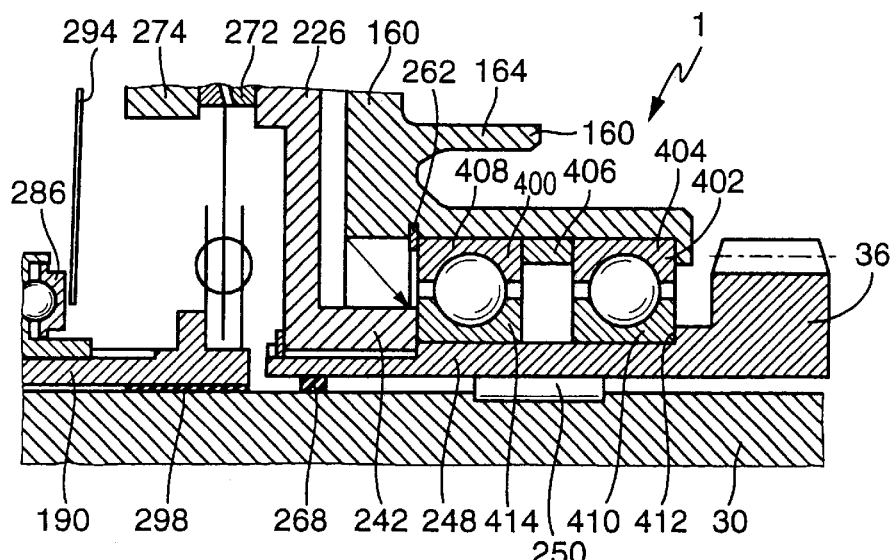
FIG. 8 shows an eighth embodiment by way of example of the invention in diagrammatic partially sectional view.

FIG. 8 shows an example of an embodiment according to the invention in diagrammatic part-sectional view in which in particular the bearing of the clutch housing 160 in respect of the axial projection 248 of the toothed wheel 36 is configured differently compared with FIGS. 3 and 7.

As opposed to the embodiments according to FIGS. 3 and 7 the housing 160 in the embodiment according to FIG. 8 is mounted opposite the axial projection 248 of the toothed wheel 36 not just through one rolling bearing 254 but through a first rolling bearing 400 and through a second rolling bearing 402.

The outer ring 404 of the second rolling bearing is supported in the embodiment according to FIG. 8 as in the embodiments according to FIG. 3 and FIG. 7 on the clutch housing 160 in the axial and in the radial direction. On the other side of the outer ring 404, seen in the axial direction this outer ring is supported on the outer ring 408 of the first rolling bearing 400 through an intermediate sleeve 406. The outer ring 408 is fixed axially through a securing ring 262.

The inner ring 410 of the second rolling bearing 402 is supported axially outside on a shoulder 412 of the axial projection 248.

The inner ring 414 of the first rolling bearing 400 is supported axially outside on the sleeve 242 of the first flywheel 226.

The inner rings 410, 414 are free axially on the inside, thus on the side facing the relevant other rolling bearing 404, 402.

Figure 9:
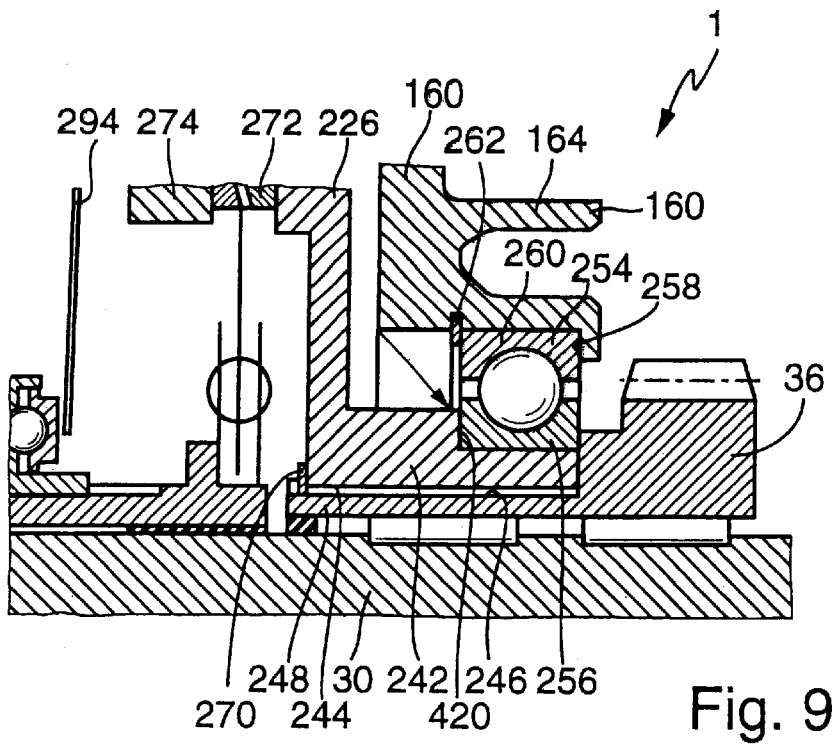
FIG. 9 shows a ninth embodiment by way of example of the invention in diagrammatic partially sectional view.

In the embodiment according to FIG. 9 as opposed to the embodiments according to FIG. 3 and FIG. 7 the housing 160 is mounted radially not on the axial projection 248 of the toothed wheel 36 but on the sleeve 242 of the first flywheel 226. To this end the sleeve 242 has a shoulder 420 adjoined in the axial direction by the inner ring 256 of the rolling bearing 254. On the side remote from this shoulder 420 the inner ring 256 of the rolling bearing 254 bears against the toothed wheel 36 or the axial projection 248 of this toothed wheel 36.

The wedged spline 244 of the sleeve 242 as well as the wedged spline 246 of the axial projection 248 extends in the embodiment according to FIG. 9 radially inside the inner ring 256 of the rolling bearing 254, namely so that seen in the axial direction a wedged spline 244 as well as a wedged spline 246 are arranged in the cylindrical region spanned by the inner ring 256.

Figure 10:
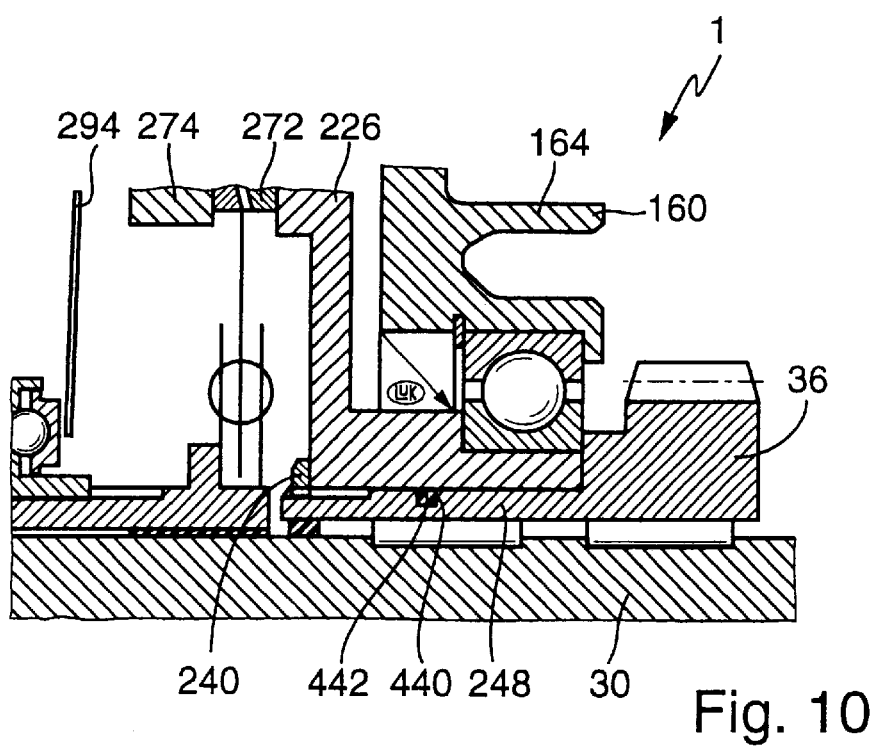
FIG. 10 shows a tenth embodiment by way of example of the invention in diagrammatic partially sectional view.

The embodiment of a torque transfer device according to the invention as shown in FIG. 10 differs from the embodiment as shown in FIG. 9 in particular in that according to FIG. 10 instead of a wedged spline 244, 246 provided between the first flywheel 226 and the axial projection 248 of the toothed wheel 36 there is an axial toothed region as well as a central bore. Furthermore in the embodiment according to FIG. 10 the first flywheel 226 is secured not as in FIG. 9 axially through a securing ring 270 but through a wave nut 240 which is screwed onto the axial projection 248 of the toothed wheel 36. The axial projection 248 has a groove 440 in which an O-ring 442 is fitted which seals the axial projection 248 from the first flywheel 226.

The seals and sealing devices are each static or dynamic sealing devices.

Figure 11:
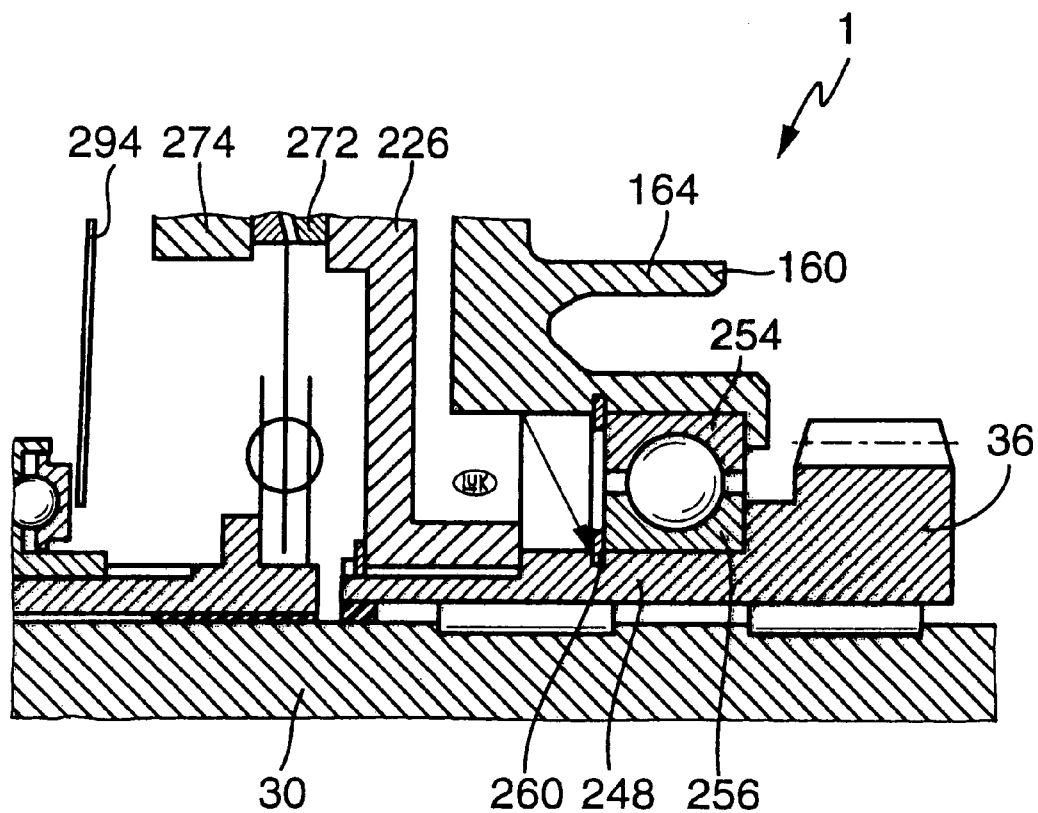
FIG. 11 shows an eleventh embodiment by way of example of the invention in diagrammatic partially sectional view.

In the embodiment according to FIG. 11 the inner ring 256 of the rolling bearing 254 unlike in the embodiments according to FIG. 3 and according to FIG. 7 lies axially not against the sleeve 242 of the first flywheel 226 but against a further securing ring 260.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of the sub-claims can form independent and proper inventions in respect of the prior art known on the priority date the applicant reserves the right to make them the subject of independent claims and partial declarations. They can also contain independent inventions which have a configuration independent of the subjects of the preceding sub-claims.

The embodiments are not to be regarded as a restriction of the invention. Rather within the scope of the present disclosure numerous modifications and amendments are possible, particularly those variations, elements and combinations and/or materials which e.g. through a combination or modification of individual features or elements or method steps described in connection with the general description and embodiments as well as claims and are contained in the drawings can be drawn on by the expert with a view to solving the problem posed by the invention and which through a combination of features lead to a new subject or new method steps or sequence of method steps, where they relate to manufacturing, test and work processes.

What is claimed is:

1. A torque transfer device comprising
   at least a first clutch device which is a power shift clutch device and which has a first input device and a first output device wherein this input device turns relative to the first output device under predetermined conditions; and
   at least a second clutch device which is a start-up clutch and which has a second input device and a second output device wherein this second input device turns relative to the second output device under predetermined conditions; wherein
      the first and the second clutch device are mounted inside a drive train between a drive side and an output side;
      the inertia masses of the first input device and the first output device are different;
      the inertia masses of the second input device and the second output device are different; and
      the one of these devices of the first clutch device which has the greater inertia mass and/or the one of these devices of the second clutch device which has the greater inertia mass faces the output side.

2. A torque transfer device as defined in claim 1, wherein in one of the two clutch devices the input device has the greater mass and in the other of the two clutch devices the output device has the greater mass.

3. A torque transfer device as defined in claim 1, wherein the first output device of the first clutch device has a greater mass than the first input device of the first clutch device and the second input device of the second clutch device has a greater mass than the second output device of the second clutch device.

4. A torque transfer device as defined in claim 1, wherein the first input device or output device associated with the first clutch device which of these two devices has the greater mass has at least a first flywheel body.

5. A torque transfer device as defined in claim 4, wherein the second input device or output device associated with the second clutch device which of these two devices has the greater mass has at least a second flywheel body.

6. A torque transfer device as defined in claim 5, wherein at least one of the flywheel bodies has a disc-shaped component part.

7. A torque transfer device as defined in claim 5, wherein at least one of the flywheel bodies has a cover-shaped component part.

8. A torque transfer device as defined in claim 5, wherein at least one of the flywheel bodies has or is a housing.

9. A torque transfer device as defined in claim 5, wherein the first flywheel body of the first clutch device has a first clutch cover or is coupled substantially rotationally secured to a first clutch cover and/or the second flywheel body of the second clutch device has a second clutch cover or is coupled substantially rotationally secured to a second clutch cover.

10. A torque transfer device as defined in claim 5, wherein
the first input device of the first clutch device has the first clutch disc;
the second input device of the second clutch device has the second flywheel body;
the first output device of the first clutch device has the first flywheel body; and
the second output device of the second clutch device has the second clutch disc.

11. A torque transfer device as defined in claim 1, wherein the first and second clutch device are shifted in parallel.

12. A torque transfer device as defined in claim 1, wherein the second input device of the second clutch device is coupled rotationally secured and axially displaceable to the first input device of the first clutch device.

13. A torque transfer device as defined in claim 1, wherein the second input device of the second clutch device is releasably coupled to the first input device of the first clutch device.

14. A torque transfer device as defined in claim 1, further comprising at least one actuating device which actuates at least one of the first and second clutch devices.

15. A torque transfer device as defined in claim 14, wherein the first clutch device has a first release lever device with a first release lever which loads a first contact pressure plate of the first clutch device under predetermined conditions.

16. A torque transfer device as defined in claim 15, wherein the second clutch device has a second release lever device with a second release lever which loads a second contact pressure plate of the second clutch device under predetermined conditions.

17. A torque transfer device as defined in claim 16, wherein at least one of the first and second release levers is a plate spring.

18. A torque transfer device as defined in claim 16, wherein at least one of the first and second release levers is formed substantially rigid.

19. A torque transfer device as defined in claim 16, wherein the first release lever is rigid and the second release lever is substantially a plate spring.

20. A torque transfer device as defined in claim 16, wherein the actuating device has at least one actuating release mechanism which under predetermined conditions contacts and loads the first and/or second release lever for actuating the first and/or second clutch device.

21. A torque transfer device as defined in claim 20, wherein the actuating release mechanism is mounted axially displaceable and where necessary rotationally secured.

22. A torque transfer device as defined in claim 20, wherein the actuating release mechanism contacts at least one of the first and second release levers through at least one bearing which is in particular a rolling bearing or a slide bearing.

23. A torque transfer device as defined in claim 16, wherein the first release lever of the first clutch device is mounted on the side of the first clutch device facing the second clutch device and the second release lever of the second clutch device is mounted on the side of the second clutch device facing the first clutch device.

24. A torque transfer device as defined in claim 20, wherein the actuating release mechanism is mounted in the axial direction substantially between the first and second clutch device.

25. A torque transfer device as defined in claim 1, further comprising a transmission device.

26. A torque transfer device as defined in claim 25, wherein the transmission device has several wheels through which under predetermined conditions torque is transferred in different shift positions through different combinations of these wheels.

27. A torque transfer device as defined in claim 25, wherein the transmission device has at least a first and at least a second shaft between which different transmission stages can be shifted, which have at least partially different transmission ratios wherein
one of these transmission stages mounted between the first and second shaft and designated in particular a power shift transmission stage has a wheel mounted rotatable on the first shaft and which can be coupled rotationally secured to this first shaft through the first clutch device and engages directly or indirectly in a wheel mounted rotationally secured on the second shaft; and
at least another of these transmission stages mounted between the first and second shaft and designated a gear transmission stage has a wheel mounted rotatable on the first or second shaft and which can be coupled rotationally secured through a third clutch device to this first or second shaft, as well as a wheel mounted rotationally secured on the other of these two shafts wherein under predetermined conditions with a closed third clutch device torque can be transferred between the first and second shaft through this gear transmission stage in which the third clutch device engages.

28. A torque transfer device as defined in claim 27, wherein the first clutch device such as power shift device under predetermined conditions is shifted in a closed shift position and enables torque transfer between the first and second shaft at least then when all third clutch devices are shifted substantially in an open shift position.

29. A torque transfer device as defined in claim 25, wherein the first clutch device is a power shift clutch device which is actuated or shifted into a closed shift position in particular when the transmission device (44) is shifted into a different transmission stage.

30. A torque transfer device as defined in claim 1, further comprising at least a third clutch device.

31. A torque transfer device as defined in claim 1, further comprising a motor vehicle drive device mounted on the drive side of at least one of the first and second clutch devices and under predetermined conditions introduces torque into at least one of the first and second clutch devices.

32. A control device for operating a torque transfer device as defined in claim 1, wherein the control device comprises an electronic control device.

33. A torque transfer device comprising
at least a first clutch device which is a power shift clutch device and which has a first input device and a first output device wherein this input device turns relative to the first output device under predetermined conditions; and
at least a second clutch device which is a start-up clutch and which has a second input device and a second output device wherein this second input device turns relative to the second output device under predetermined conditions; wherein the first and second clutch device are mounted inside a drive train between a drive side and an output side;

the first and second clutch device are connected in parallel inside the drive train so that the first clutch device is mounted substantially in a first drive train branch and the second clutch device is mounted substantially in a second drive train branch connected in parallel with the first;

the first and second clutch device has on the drive and/or output side a first device which is associated with both clutch devices;

the first and second clutch device can be loaded on the drive side by a device with a first mass;

the first clutch device is configured so that a load acting on the first clutch device and on at least a component part coupled thereto and which load is transferred through the device with the first mass under predetermined conditions causes the first clutch device and/or the at least one coupled component part to react to this load due to a series connection of a first spring and/or damping device with a second mass connected in behind in the output direction and an adjoining first separating device (134) which can at least restrict the torque transfer, as well as with a third mass adjoining this separating device on the output side.

34. A torque transfer device as defined in claim 33, wherein the reaction of the first clutch device and/or of the at least one component part coupled thereto to the load is provided through the device with the first mass substantially inside the first drive train branch.

35. A torque transfer device as defined in claim 33, wherein the second clutch device is configured so that load of the second clutch device through the device with the first mass under predetermined conditions has the effect that the second clutch device, as well as at least one component part coupled thereto reacts to this load, due to a series connection of a second separating device which can at least restrict the torque transfer, with a fourth mass connected on the output side in the output direction and a second spring and/or damper system connected on the output side as well as a fifth mass in turn connected on the output side.

36. A torque transfer device as defined in claim 35, wherein the second clutch device is configured so that load of the second clutch device, as well as at least one component part coupled thereto through the device with the first mass under predetermined conditions has the effect that the second clutch device and/or this at least one coupled component reacts to this load, due to a series connection wherein a shift connection is connected in on the output side of the fifth mass on the output side wherein a sixth mass is provided on the output side of the shift connection.

37. A torque transfer device as defined in claim 35, wherein the fourth and fifth mass are different wherein the fourth mass is greater than the fifth mass.

38. A torque transfer device as defined in claim 35, wherein the second and fourth mass are substantially the same size under predetermined conditions.

39. A torque transfer device as defined in claim 35, wherein the second mass is substantially the mass of a clutch disc of the first clutch device and/or the fourth mass is substantially the mass of a clutch disc of the second clutch device.

40. A torque transfer device as defined in claim 35, wherein the first and second drive train branch are brought together at a predetermined point or in a predetermined region on the output side.

41. A torque transfer device as defined in claim 40, wherein the drive train on the output side of the predetermined point or predetermined region at which the first and second drive train branch are brought together on the output side reacts to a load transferred through the first and/or second clutch device through the device with the first mass due to a series connection of a third spring and/or damper device with a seventh mass connected in on the output side wherein predetermined characteristics of this spring and/or damper device and/or this seventh mass depend where necessary on the shift position of the first and/or second separating device and/or shift device.

42. A torque transfer device as defined in claim 33, wherein the reaction of the second clutch device and/or of the at least one coupled component to the load through the device with the first mass is provided substantially inside the second drive train branch.

43. A torque transfer device as defined in claim 33, wherein the second and third mass are different wherein the third mass is greater than the second mass.

44. A torque transfer device as defined in claim 33, wherein the first clutch device has at least a first spring and/or damper device and/or the second clutch device has at least a second spring and/or damper device.

45. A torque transfer device as defined in claim 44, wherein the first spring and/or damper device is integrated at least in part in at least a first clutch disc.

46. A torque transfer device as defined in claim 45, wherein the first spring and/or damper device is mounted at least in part outside of the first clutch disc.

47. A torque transfer device as defined in claim 44, wherein the second spring and/or damper device is integrated at least in part in at least one second clutch disc.

48. A torque transfer device as defined in claim 47, wherein the second spring and/or damper device is mounted at least in part outside of the second clutch disc.

49. A torque transfer device as defined in claim 44, wherein the first spring and/or damper device is mounted inside the first drive train branch.

50. A torque transfer device as defined in claim 44, wherein the second spring and/or damper device is mounted inside the second drive train branch.

* * * * *

UNITED STATES PATENT AND TRADEMARK OFFICE
CERTIFICATE OF CORRECTION

PATENT NO. : 6,668,994 B2
DATED : December 30, 2003
INVENTOR(S) : Gunter Hirt

It is certified that error appears in the above-identified patent and that said Letters Patent is hereby corrected as shown below:

<u>Title page,</u>
Insert item -- [30] Foreign Application Priority Data
February 15, 2000 (DE) ……………......100 06 543.0 --

Signed and Sealed this

First Day of June, 2004

JON W. DUDAS
*Acting Director of the United States Patent and Trademark Office*